United States Patent [19]
Matteucci

[11] Patent Number: 5,884,229
[45] Date of Patent: Mar. 16, 1999

[54] METHOD FOR MEASURING LATERAL CONTINUITY AT A SPECIFIED SUBSURFACE LOCATION FROM SEISMIC DATA

[75] Inventor: Gianni Matteucci, Houston, Tex.

[73] Assignee: Exxon Production Research Company, Houston, Tex.

[21] Appl. No.: 832,400

[22] Filed: Apr. 3, 1997

Related U.S. Application Data

[60] Provisional application No. 60/019,746, Jun. 10, 1996.

[51] Int. Cl.[6] .................................................. G06F 19/00
[52] U.S. Cl. ............................................................. 702/14
[58] Field of Search ................................. 702/11, 12, 13, 702/14, 16, 17, 18; 367/40, 42, 51, 52

[56] References Cited

U.S. PATENT DOCUMENTS

| | | | |
|---|---|---|---|
| 4,926,394 | 5/1990 | Doyen | 367/73 |
| 5,563,949 | 10/1996 | Bahorich et al. | 364/421 |

OTHER PUBLICATIONS

Press, William H., et al., 1992, *Numerical Recipes in C: The Art of Scientific Computing*, Second Edition, Cambridge University Press, pp. 609, 610, 620–628, and 636–645.

Tinker, Gordon E., et al., "Connectivity mapping improves understanding of reservoir continuity," *Oil & Gas Journal*, Dec. 20, 1993, pp. 87–91.

Frank, John R. Jr., et al., "Combining Data Helps Pinpoint Infill Drilling Targets In Texas Field," *Oil & Gas Journal*, May 31, 1993, pp. 48–53.

Sheriff, R. E., 1980, *Seismic Stratigraphy*, published by International Human Resources Development Corporation, Boston, Massachusetts, pp. 85–116 and 161–183.

Lu, S. Y. and Cheng, Y.C., 1990, "An iterative approach to seismic skeletonization," *Geophysics*, vol. 55, pp. 1312–1320.

Gibson, B. S. and Levander, A.R., 1990, "Apparent layering in common–midpoint stacked images of two–dimensionally heterogeneous targets," *Geophysics*, vol. 55, pp. 1466–1477.

Gibson, B. S., 1991, "Analysis of lateral coherence in wide–angle seismic images of heterogeneous targets," *Journal of Geophysical Research*, vol. 96, pp. 10261–10273.

Vossler, D. A., 1989, "Automatic delineation of lateral facies changes in clastic environments," Proceedings of the 59th Annual International Meeting, Society of Exploration Geophysicists, Paper SI 5.4, pp. 803–804, Tulsa, Oklahoma.

*Primary Examiner*—Donald E. McElheny, Jr.
*Attorney, Agent, or Firm*—Keith A. Bell

[57] ABSTRACT

A method for quantitatively measuring lateral continuity at a specified subsurface location from seismic data. The seismic data trace nearest to the specified location is designated as the reference trace. Next, all data traces falling within a specified distance from the reference trace are extracted from the data, and one or more statistics which measure the similarity between each trace and the reference trace are calculated. Only the portions of the traces falling within the target formation are considered. Preferably, the statistics should permit comparison of both the temporal and atemporal behaviors of the traces. The results are compared to objective significance tests to determine whether each trace is the same as or different from the reference trace.

23 Claims, 10 Drawing Sheets

METHOD FOR MEASURING LATERAL CONTINUITY AT A SPECIFIED SUBSURFACE LOCATION FROM SEISMIC DATA

This application claims the benefit of U.S. Provisional Application Ser. No. 60/019,746, filed Jun. 10, 1996.

FIELD OF THE INVENTION

This invention relates generally to the field of seismic stratigraphy and, more particularly, to seismic facies analysis and reflection character analysis. Specifically, the invention is a method for using seismic data to quantitatively measure the lateral continuity at a specified subsurface location.

BACKGROUND OF THE INVENTION

In the oil and gas industry, seismic prospecting techniques are commonly used to aid in the search for and evaluation of subterranean hydrocarbon deposits. In seismic prospecting, an energy source is used to generate a seismic signal which propagates into the earth and is at least partially reflected by subsurface seismic reflectors (i.e., interfaces between underground formations having different elastic properties). The reflections are detected and measured by seismic receivers located at or near the surface of the earth, in an overlying body of water, or at known depths in boreholes, and the resulting seismic data may be processed to yield information relating to the subsurface formations.

The goal of all seismic data processing is to extract from the seismic data as much information as possible regarding the subsurface formations. Early seismic data processing efforts were directed primarily toward the development of methods for determining the geologic structure of the subsurface formations, and methods have been developed which permit geologic structure to be determined with a great deal of accuracy. More recently, however, substantial efforts have been directed toward the development of methods for using seismic data to determine the nature and geologic history of sedimentary rocks and their depositional environments. This is the field of seismic stratigraphy.

Seismic facies analysis is a subdivision of seismic stratigraphy used for regional stratigraphic interpretation. Seismic facies analysis examines the seismic character of a group of reflections to aid in defining the depositional environment, lithology, and geologic history of a seismic facies unit (i.e., a three-dimensional unit of seismic reflections whose characteristics differ from those of adjacent units). As used herein, "seismic character" means any recognizable aspect of a seismic event (e.g., a change in dominant frequency). In other words, the character of a seismic event is the waveshape which distinguishes it from other seismic events. Background information on seismic facies analysis may be found in Sheriff, R. E., 1980, *Seismic Stratigraphy*, published by International Human Resources Development Corporation, Boston, Mass., pp. 85–116.

Reflection character analysis is another subdivision of seismic stratigraphy which attempts to relate lateral trace-to-trace changes in waveshape to changes in the stratigraphy or interstitial pore fluid of a subsurface formation. These changes are typically in the amplitude, polarity, frequency, seismic velocity, or thickness (i.e., the interval between seismic events) of the reflected wave. Background information on reflection character analysis may be found in Sheriff, supra, pp. 161–183.

One property of seismic data which is useful in seismic stratigraphy is the continuity of the data. As used in connection with the present invention, "continuity" means the maximum lateral distance from a specified location and in a specified azimuthal direction for which the reflection character of a seismic event is essentially unchanged. Knowledge of the lateral continuity around any location is useful for a variety of purposes including, without limitation, checking the reliability of the related seismic interpretation, characterizing the subsurface stratigraphic interval in terms of its seismic facies, assisting in the placement of wells, and assessing the size and determining the volume of hydrocarbons-in-place for the region around an existing well or a proposed new well location.

Unfortunately, heretofore seismic reflection continuity has typically been estimated visually, either on standard displays of seismic data or on instantaneous phase displays. Although several methods have been proposed, there are currently no known methods for quantitatively measuring seismic reflection continuity for a stratigraphic interval which take into account the fact that both the shape and the amplitude of the signals must be considered in determining continuity, the local character of continuity (i.e., that continuity should be measured with respect to a specific location), or the angular (azimuthal) dependence of continuity.

One method which was previously proposed for quantitatively measuring seismic continuity is described in Lu, S. Y. and Cheng, Y. C., 1990, "An iterative approach to seismic skeletonization," *Geophysics*, vol. 55, pp. 1312–1320. This method attempted to develop pattern recognition algorithms for skeletonizing seismic reflection events. The skeletons of the seismic reflections were then used to measure the average skeletonized seismic reflection length for a window of traces along a 2D seismic line within a stratigraphic sequence. The resulting measure, however, was a window-averaged measure which necessarily depends on the choice of window width. This method does not consider the amplitude similarity of the data and does not recognize either the angular dependence of continuity or its local nature.

Another method which has been proposed for quantitatively measuring seismic continuity uses lateral variations in the spectral coefficient of coherence as a measure of continuity. See, Gibson, B. S. and Levander, A. R., 1990, "Apparent layering in common-midpoint stacked images of two-dimensionally heterogeneous targets," *Geophysics*, vol. 55, pp. 1466–1477 and Gibson, B. S., 1991, "Analysis of lateral coherency in wide-angle seismic images of heterogeneous targets," *Journal of Geophysical Research*, vol. 96, pp. 10261–10273. This method was originally developed for use with prestack seismic data, but could be generalized for use with stacked data. According to this method, the spectral coefficient of coherence, which is a function of frequency, is defined for a specified window. The coefficient is actually an average measure of the similarity of the seismic signals within the window and, therefore, necessarily depends on the choice of window width. Again, this method does not take into account the amplitude similarity of the data, the angular dependence of continuity, or the local nature of continuity. Moreover, the frequency dependence of coherence requires application of Fourier transformations to the seismic data, and because of the limitations of Fourier analysis for short time windows, this method is reliable only for seismic intervals much thicker than typically encountered.

The semblance coefficient has been proposed as a measure of lateral changes in seismic facies. See, Vossler, D. A., 1989, "Automatic delineation of lateral facies changes in clastic environments," Proceedings of the 59th Annual International Meeting, Society of Exploration Geophysicists, Paper SI 5.4, pp. 803–804, Tulsa, Okla. Although usually applied to prestack seismic data, this method could be generalized to stacked data to measure continuity. However, as with the coefficient of coherence, semblance is calculated for a specified window and, accordingly, necessarily depends on the choice of window width. Therefore, semblance does not measure a trace-to-trace geometric length having a specified azimuthal direction, but rather a property of the selected data window.

Finally, variogram analysis is another type of analysis which could be used to measure seismic continuity. The range of the variogram, i.e., the distance at which the spatial correlation vanishes along a given direction, is often mentioned as a measure of the "continuity distance" for the analyzed variable, and could be used as a spatial measure of continuity. However, the range of a variogram is an average value since it does not correspond to any specific location. Further, when seismic intervals of varying thicknesses are considered, as is often the case, the seismic signal for any given trace must be represented by a selected attribute. The variogram analysis is then applied to the selected attribute to estimate the continuity along a chosen direction. The resulting distance would be a reliable approximation of seismic continuity only to the degree that the selected attribute is a complete descriptor of the seismic character of the interval. If the selected attribute is not representative of the seismic character of the interval, then the result of the variogram analysis is not an accurate measure of seismic continuity.

From the foregoing discussion, it is apparent that there is a need for a reliable method for quantitatively estimating the lateral continuity of the seismic reflection character around any given location. The present invention satisfies this need.

SUMMARY OF THE INVENTION

The present invention is a statistical method for quantitatively measuring the lateral continuity of the seismic reflection character at any specified location in a subsurface target formation. The resulting measure of continuity is a lateral distance which depends on the orientation of the line along which it is measured.

The inventive method for determining lateral continuity requires the availability of a seismic survey which, preferably, has been processed and interpreted, and the upper and lower horizons of a target interval have been identified and mapped. Alternatively, if the survey has not been interpreted, the method may be used in a reconnaissance mode to discover spatial geometric features in the data which are suggestive of certain geologic and/or depositional environments. In this case, the top and bottom horizons would be either regular time horizons or slanted time horizons.

The method may be used with either 2D or 3D seismic data. Further, the method may be applied to any type of seismic data trace, including a transformed trace such as a quadrature trace. Preferably, the method is implemented by a seismic data interpreter using a digital computer. Persons skilled in the art of seismic data processing and interpretation could easily develop computer software for implementing the method based on the teachings set forth herein.

In a first embodiment, the inventive method comprises the steps of (a) selecting the seismic data trace nearest to the specified location and designating this trace as the reference trace; (b) for each seismic data trace located within a specified lateral distance from the reference trace, (i) calculating at least one statistic that measures the similarity between the portion of the seismic data trace within the subsurface target formation and the portion of the reference trace within the subsurface target formation, each such statistic having a corresponding significance test, and (ii) comparing each statistic to the corresponding significance test to determine whether the seismic data trace is the same as or different from the reference trace; and (c) using the results of step (b) to quantitatively measure the lateral continuity at the reference trace. Preferably, the statistic or statistics used should be capable of measuring the similarity of both the temporal and atemporal behaviors of the traces. Many different ways may be used to summarize and/or display the results obtained using the present invention.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

Figure 1:
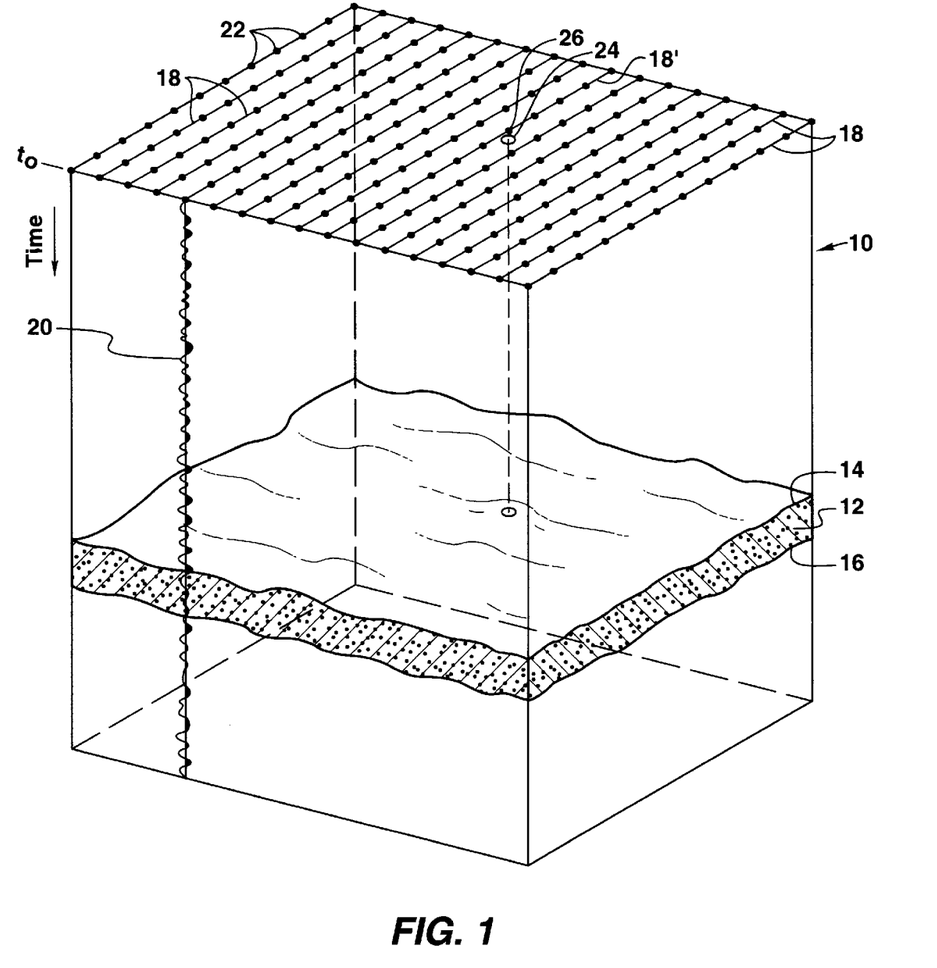
FIG. 1 illustrates a 3D seismic survey of a portion of the earth's subsurface which contains a subsurface target formation.

FIG. 1 illustrates a portion of the earth 10 containing a subsurface formation 12 which is defined by an upper horizon 14 and a lower horizon 16. Subsurface strata located above upper horizon 14 or below lower horizon 16 have been deleted for clarity. A 3D seismic survey has been conducted, processed, and interpreted for this portion of the earth. As is well known in the art, 3D seismic data typically comprise a set of substantially parallel 2D survey lines, such as survey lines 18, each of which consists of a series of stacked seismic data traces 20 (only one shown for clarity) located at spaced-apart positions 22 along the survey line. Each data trace 20 shows the two-way seismic signal traveltime to the various reflection events. Time $t_0$ typically represents the surface of the earth, although any other horizontal datum may be used if desired.

The method of the present invention begins by selecting a data trace and designating this trace as the reference trace. If a well has been drilled in the survey area, the data trace nearest to the well may be designated as the reference trace so that the lateral continuity around the well can be determined. Next, all traces falling within a specified distance from the reference trace are extracted from the survey, and one or more statistics which measure the similarity between the reference trace and each of the other traces are calculated. Only the portions of the traces falling within the target interval (e.g., subsurface formation 12 in FIG. 1) are used in calculating the statistics. Finally, the calculated statistics are used to make a determination of whether or not the reflection character within the target interval of each of the extracted traces is the same as or different from that of the reference trace. Preferably, this determination is based on objective significance tests which permit the user to select the desired confidence level. Thus, the invention overcomes a primary deficiency of prior methods for determining continuity, i.e., their subjective nature.

As noted above, the continuity determination is based on one or more statistics which measure the similarity between the reference trace and each of the other traces. As more fully described below, there are several known statistics which may be used for this purpose, and others could no doubt be developed. In any event, however, the statistic or statistics used should preferably be capable of permitting comparison of both the temporal (frequency and phase) and atemporal (amplitude) behaviors of the traces.

As is well known to persons of ordinary skill in the art, a seismic data trace actually comprises a time series of discrete measurements of the amplitude of the seismic signal taken at a uniform time interval, e.g., two milliseconds. In applying the method of the present invention, the two traces being compared should each have the same number of data samples so that the statistics are based on data sets of equal size. Where the target seismic interval thins or thickens laterally away from the reference trace, so that the two traces do not have the same number of data samples within the interval, a portion of the longer trace should be ignored. Therefore, the choice of whether to datum the upper or the lower horizon is an important one because it will dictate which data samples are to be ignored. Generally, the type of upper and lower horizons (i.e., whether they correspond to unconformities, erosional surfaces, and so on) will dictate whether the statistics are better calculated by datuming the upper or the lower horizon.

The statistics can be calculated using the actual seismic data sample values, by resampling the seismic signals to a finer temporal resolution, or by resampling the signals so that they have the same number of samples within the target interval (e.g., to investigate whether a geologic interval has been stretched or compressed). As will be readily understood by persons skilled in the art, the pecularities of the target interval (e.g., its thickening and thinning away from the well, the number of data samples within the interval, and the exact placement of the interpreted horizons) will determine to a large extent which method is more appropriate.

In a preferred embodiment, the invention measures the similarity between two seismic data traces using two statistical parameters, the linear correlation coefficient r and the Kolmogorov-Smirnov statistic D, and associated significance tests. The linear correlation coefficient r measures the similarity in the temporal behavior of the traces, and the Kolmogorov-Smirnov statistic D measures the similarity in the atemporal behavior of the traces. These two statistics are complementary to each other; they measure some of the most general properties of a signal (namely, the change in shape, amplitude and frequency content) without focusing on a single aspect or attribute. The associated significance tests permit the user to specify the desired confidence level.

The linear correlation coefficient r measures the strength of the relationship between the frequency and phase, but not the amplitude, of the two seismic data traces. The linear correlation coefficient r between any two seismic data traces, each of which consists of N data samples, can be calculated from the following formula:

$$r = \frac{\sum_i (x_i - \bar{x})(y_i - \bar{y})}{\sqrt{\sum_i (x_i - \bar{x})^2} \sqrt{\sum_i (y_i - \bar{y})^2}} \qquad (1)$$

where $x_i (i=1, \ldots, N)$ represents the data samples of the first trace; $y_i (i=1, \ldots, N)$ represents the data samples of the second trace; $\bar{x}$ is the mean of the $x_i$'s; and $\bar{y}$ is the mean of the $y_i$'s. In all cases, the value of r will be between −1 and +1, inclusive. If the value is 1, then there is "complete positive correlation" in the frequency and phase of the two traces. If, on the other hand, the value of r is −1, there is "complete negative correlation" between the frequency and phase of the two traces. A value near zero indicates that the traces are uncorrelated. Further information on the linear correlation coefficient and its related significance tests may be found, for example, in Press, William H., et al., 1992, *Numerical Recipes in C: The Art of Scientific Computing*, Second Edition, Cambridge University Press, pp. 636–639.

The Kolmogorov-Smirnov statistic D measures the similarity of the amplitude distributions of the two seismic data traces. Thus, D measures the atemporal behavior of the two data traces. It is extremely sensitive to amplitude changes, but insensitive to temporal changes (i.e., changes in frequency and/or phase) since only the data values are used with no reference to the corresponding time values. Values of D vary between zero (no difference) and +1 (complete difference). The Kolmogorov-Smirnov statistic is defined as the maximum value of the absolute difference between the cumulative distribution functions for the two seismic data traces. In other words, $$D = \max_{-\infty < x < \infty} |S_{N_1}(x) - S_{N_2}(x)| \quad (2)$$

where $S_{N^1}(X)$ is the cumulative distribution function for the first data trace and $S_{N^2}(X)$ is the cumulative distribution function for the second data trace. A cumulative distribution function is a function giving the fraction of the data points to the left of a given value of x. Thus, the cumulative distribution function is zero for all points to the left of the smallest value of x and 1 for all points to the right of the largest value of x. Between the smallest and largest values of x, the cumulative distribution function jumps by a constant 1/N at each $x_i$. Further information on the Kolmogorov-Smirnov statistic and its related significance tests may be found in Press et al., supra, pp. 623–628.

Other statistical parameters may be used, if desired. For example, the nonparametric Spearman rank-order correlation coefficient $r_S$ may be used in place of the linear correlation coefficient r. In calculating this statistic, each of the data sample values is replaced by the value of its rank among all of the other data sample values (i.e., 1,2,3, ..., N), and $r_s$ is calculated according to the following formula:

$$r_s = \frac{\sum_i (R_i - \overline{R})(S_i - \overline{S})}{\sqrt{\sum_i (R_i - \overline{R})^2} \sqrt{\sum_i (S_i - \overline{S})^2}} \quad (3)$$

where $R_i$ is the rank of $x_i$ among the other x's; $S_1$ is the rank of $y_i$ among the other y's; $\overline{R}$ is the mean of the $R_i$'s; and $\overline{S}$ is the mean of the $S_i$'s. As with the linear correlation coefficient, in all cases the value of $r_s$ will be between –1 and +1 inclusive. The main advantage of using the Spearman rank order correlation coefficient $r_s$ is that it is nonparametric, and thus, its value and significance levels are more robust than for the simpler linear correlation coefficient. Further information on calculation of the Spearman rank-order correlation coefficient and its related significance tests can be found in Press et al., supra, pp. 639–642. Another nonparametric statistic which could be used in the present invention is Kendall's Tau. See, Press et al., supra, pp. 642–645.

The Kolmogorov-Smirnov statistic tends to be the most sensitive around the median value and less sensitive at the extreme ends of the distribution. One way of overcoming this is to use Kuiper's statistic V which is defined as $$V = \max_{-\infty < x < \infty} [S_{N_1}(x) - S_{N_2}(x)] + \max_{-\infty < x < \infty} [S_{N_2}(x) - S_{N_1}(x)] \quad (4)$$

where $S_{N_1}(x)$ is the cumulative distribution function for the first data trace and $S_{N_2}(X)$ is the cumulative distribution function for the second data trace. As with the Kolmogorov-Smirnov statistic, Kuiper's statistic V varies between 0 and +1. Further information on Kuiper's statistic may be found in Press et al., supra, pp. 626–627.

The various statistical measures discussed above are examples of the type of statistics that may be used in connection with the present invention. However, the scope of the invention is not intended to be limited to the statistics expressly described herein. Other suitable statistics exist or could be developed by persons of ordinary skill in the art, and use of any of these other statistics is intended to be within the scope of the invention.

The purpose of calculating the statistics, in proper statistical language, is to attempt to disprove, to a certain confidence level, the null hypothesis (i.e., that the reflection characters of the two traces are the same). Disproving the null hypothesis in effect proves that the reflection characters of the two traces are not the same. See, Press et al., supra, p. 620. On the other hand, failing to disprove the null hypothesis shows only that the reflection characters of the two traces are consistent (i.e., that they are the same within the specified level of confidence).

In a preferred embodiment of the invention, the calculated statistics are compared to objective significance tests to determine whether or not the reflection characters of the two traces are consistent. For a specified confidence level (i.e., probability) and number of data points, the significance tests specify the conditions necessary to conclude that the reflection characters of the two traces are consistent. Preferably, threshold values for each statistic based on a chosen level of confidence (e.g., 95%) are used rather than fixed values in order to remove the effect of the number of data points used in calculating the statistics.

Figure 2:
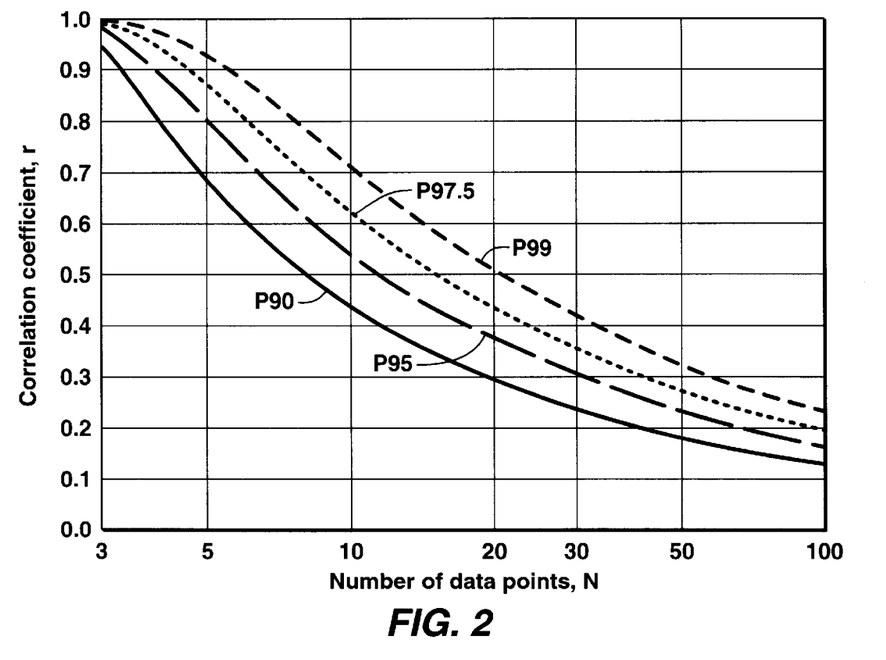
FIG. 2 is a plot of several confidence level curves for the linear correlation coefficient.

FIG. 2 shows a number of confidence level curves for the linear correlation coefficient r. The curve labeled P99 is for a 99% confidence level; the curve labeled P97.5 is for a 97.5% confidence level; and so on. These curves can be used to determine, for a specified confidence level and number of data points, the minimum value of r necessary to conclude that the temporal behaviors of the two traces are consistent. For example, for a 99% confidence level and 20 data points, an r equal to or greater than about 0.516 is required to conclude that the reflection characters of the two traces are consistent, while for a 95% confidence level and 50 data points, an r equal to or greater than about 0.235 is required. From FIG. 2 it is apparent that, for a given confidence level, the required threshold value decreases as the number of data points increases. This reflects the fact that it is much harder to obtain a high value of r when a large number of data points are involved. Thus, use of objective significance tests removes from the analysis the sensitivity of r to the number of data points used to calculate it. Further information on confidence levels can be found in Press et al., supra, pp. 636–645.

Figure 3:
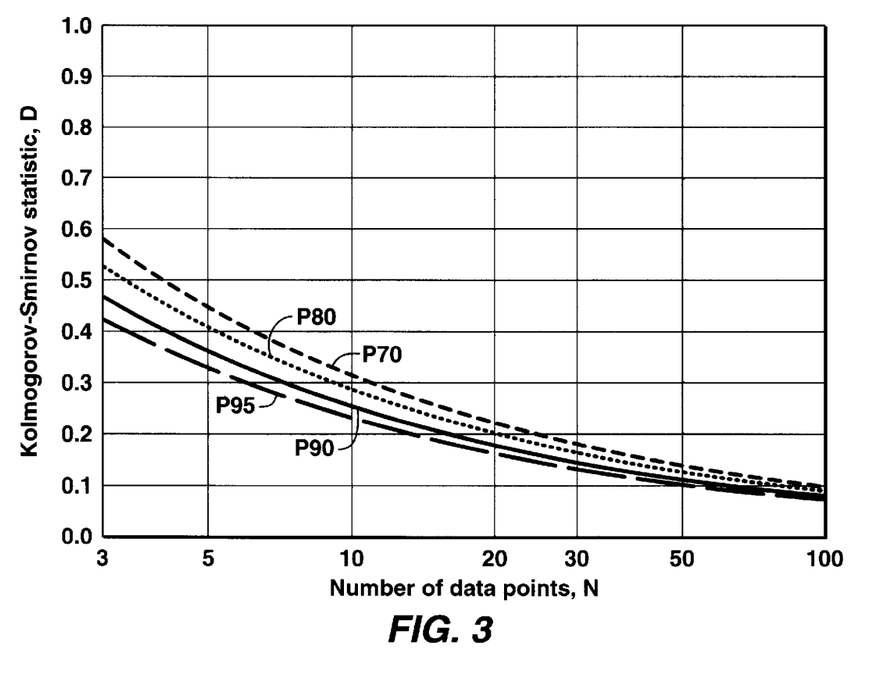
FIG. 3 is a plot of several confidence level curves for the Kolmogorov-Smirnov statistic.

FIG. 3 shows a number of confidence level curves for the Kolmogorov-Smirnov statistic D. In this case, however, the curves are used to determine the maximum value of D that will support the conclusion that the atemporal behaviors of the two traces are consistent. For example, for a confidence level of 95% and a total of 30 data points, a D equal to or less than about 0.129 is required. Again, the required threshold value decreases as the number of data points increases. However, for the Kolmogorov-Smirnov statistic D (and Kuiper's statistic V) this reflects the fact that when only a few data points are involved, a relatively large value of D (or V) may be obtained even though the two data sets are drawn from the same underlying distribution.

Statistics such as the Kolmogorov-Smirnov statistic and the linear correlation coefficient commonly provide a method for calculating the significance level at which the null hypothesis is considered to be disproved. See, discussions of these statistics in Press et al., supra. The confidence level curves in FIGS. 2 and 3 were generated by solving the inverse problem. Instead of solving for the probability value given the statistical value of r or D, the probability value and number of data points are assumed and the threshold statistical value for r or D is calculated. Persons skilled in the art could easily replicate the curves in FIGS. 2 and 3.

Figure 4:
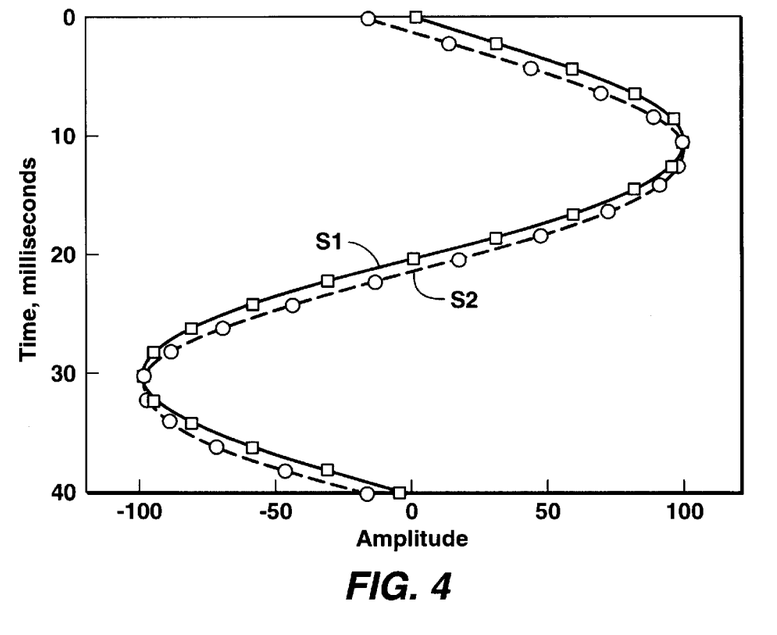
FIG. 4 is a plot of two mono-harmonic signals, S1 and S2, having the same frequency, the same amplitude, and a 10° phase difference.

FIGS. 4 and 5 illustrate these concepts. FIG. 4 shows two mono-harmonic signals S1 (solid curve) and S2 (dotted curve). One cycle (40 milliseconds) of each signal is shown. Both signals have a frequency of 25 Hertz and a maximum dimensionless amplitude of 100. There is a 10° phase shift between signals S1 and S2. The signals are sampled at 2 millisecond intervals giving a total of 21 data samples. The linear correlation coefficient r between signals S1 and S2 can be calculated from equation (1) by letting $x_i(i=1, \ldots, 21)$ be the 21 amplitude values of signal S1 and $y_i(i=1, \ldots, 21)$ be the 21 amplitude values of signal S2. This yields an r value of 0.983. From FIG. 2 it can be seen that for a 95% confidence level and 21 data points, a linear correlation coefficient of at least 0.370 is required. Thus, signals S1 and S2 clearly have similar temporal behavior.

The atemporal behavior of signals S1 and S2 can be compared by calculating the Kolmogorov-Smirnov statistic D according to equation (2). This yields a D value of 0.095. From FIG. 3 it can be seen that for a 95% confidence level and 21 data points, a Kolmogorov-Smirnov statistic less than or equal to 0.160 is required. Thus, signals S1 and S2 also have similar atemporal behavior.

Figure 5:
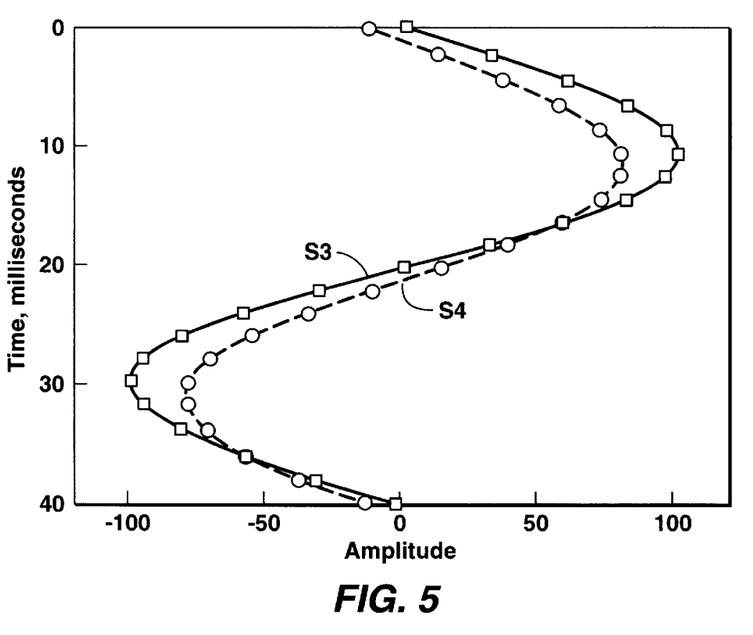
FIG. 5 is a plot of two mono-harmonic signals, S3 and S4, which are identical to signals S1 and S2 (FIG. 4), respectively, except that the amplitude values of signal S4 have been reduced to 80% of the corresponding amplitude values of signal S2.

FIG. 5 shows two mono-harmonic signals S3 (solid curve) and S4 (dotted curve). Signal S3 is identical to signal S1 (FIG. 4), and signal S4 is identical to signal S2 (FIG. 4), except that the amplitude values of signal S4 have been reduced to 80% of the corresponding amplitude values of signal S2. Application of equation (1) to signals S3 and S4 yields an r value of 0.983, which is the same as the r value for signals S1 and S2. This is to be expected because, as noted above, the linear correlation coefficient measures the similarity of temporal (phase and frequency) behavior and is insensitive to changes in atemporal (amplitude) behavior. In fact, it can be shown that r is insensitive to any linear scaling of the signals. However, application of equation (2) to signals S3 and S4 yields a Kolmogorov-Smirnov statistic D of 0.238. This value of D is considerably higher that the 0.160 maximum for a 95% confidence level. In fact, it can be seen from FIG. 3 that a D value of 0.238 is too high to satisfy the significance test for any of the other confidence levels shown. Thus, a mere 20% change in amplitude for an interval consisting of 21 data samples is large enough to be captured by this measure of similarity. From FIG. 3 (confidence level curves for the Kolmogorov-Smirnov statistic) it follows that for a stricter test (i.e., a higher confidence level) an even smaller change in amplitude could cause the Kolmogorov-Smirnov test to be failed.

FIGS. 4 and 5 illustrate the benefits of using statistical measures which permit comparison of both the temporal and atemporal behaviors of the signals. While the linear correlation coefficient is insensitive to changes in temporal behavior, these changes are detected by the Kolmogorov-Smirnov statistic. Similarly, changes in the temporal behavior of the signals may not be detected by the Kolmogorov-Smirnov statistic, but should be picked up by the linear correlation coefficient.

Returning now to FIG. 1, assume that a well 24 has been drilled which encountered producible hydrocarbons in subsurface formation 12. It is desired to determine the lateral continuity of subsurface formation 12 around well 24 so that, for example, the need for additional wells or the volume of recoverable hydrocarbons can be determined. The data trace closest to well 24 is designated as reference trace 26. Reference trace 26 is on survey line 18'.

Figure 6:
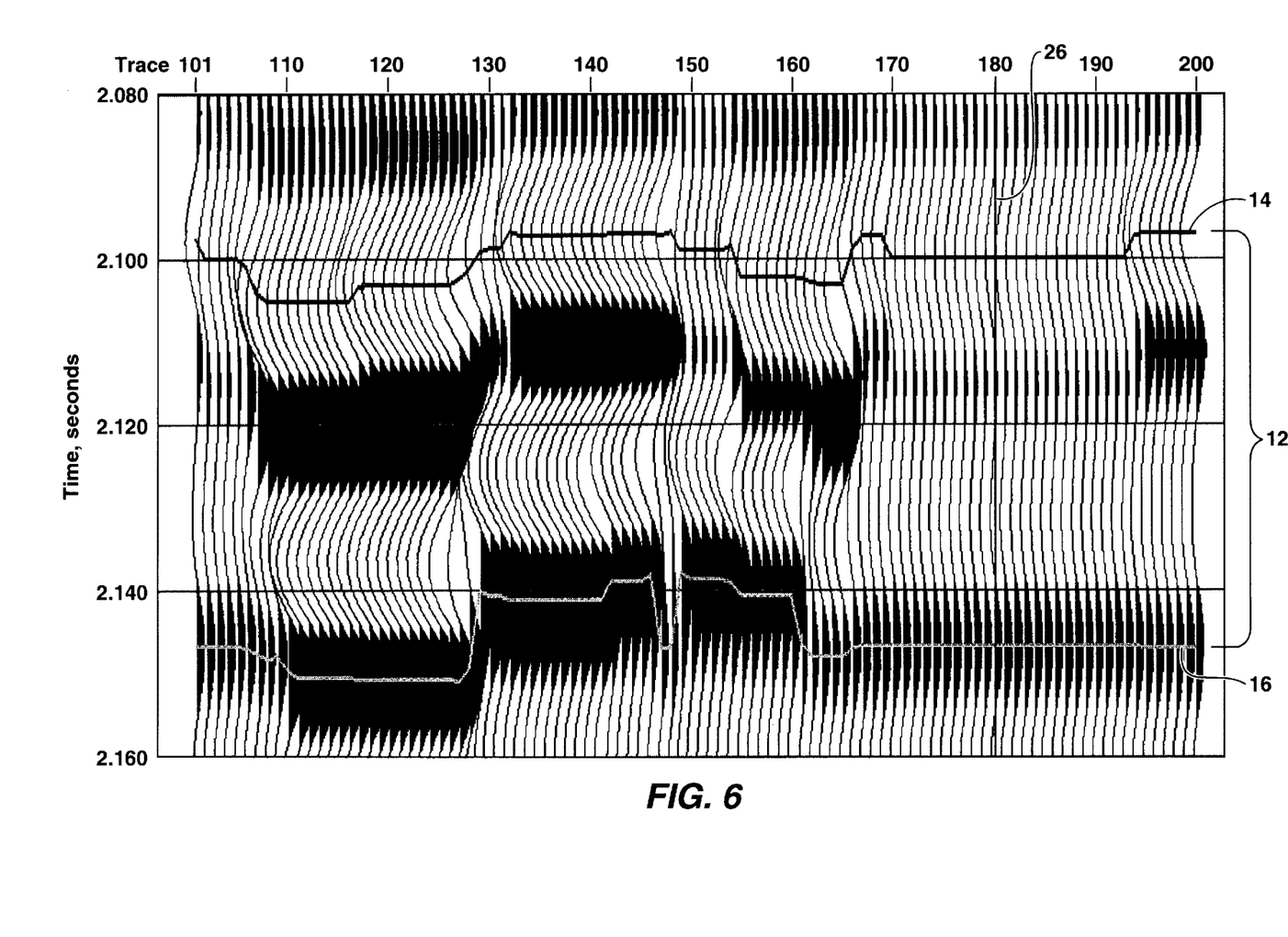
FIG. 6 is a portion of a seismic section showing 100 traces of seismic data for survey line 18' of FIG. 1.

FIG. 6 shows a portion of the stacked seismic section for survey line 18'. One hundred seismic data traces extending from trace 101 to trace 200 are shown. The time period covered extends from 2.080 seconds to 2.160 seconds and includes reflections from subsurface formation 12. Upper horizon 14 and lower horizon 16 have been identified and marked on the section. Reference trace 26 (FIG. 1) corresponds to trace 180 on FIG. 6.

FIGS. 7 through 10 illustrate application of the present invention to the seismic data shown in FIG. 6. Only the portions of the traces falling within subsurface formation 12 were used in calculating the statistics. Upper horizon 14 was used as the datum surface for calculating the statistics. The selection of upper horizon 14 as the datum surface instead of lower horizon 16 is based on stratigraphic interpretation of the depositional history of subsurface formation 12, as would be well known to persons skilled in the art.

Figure 7:
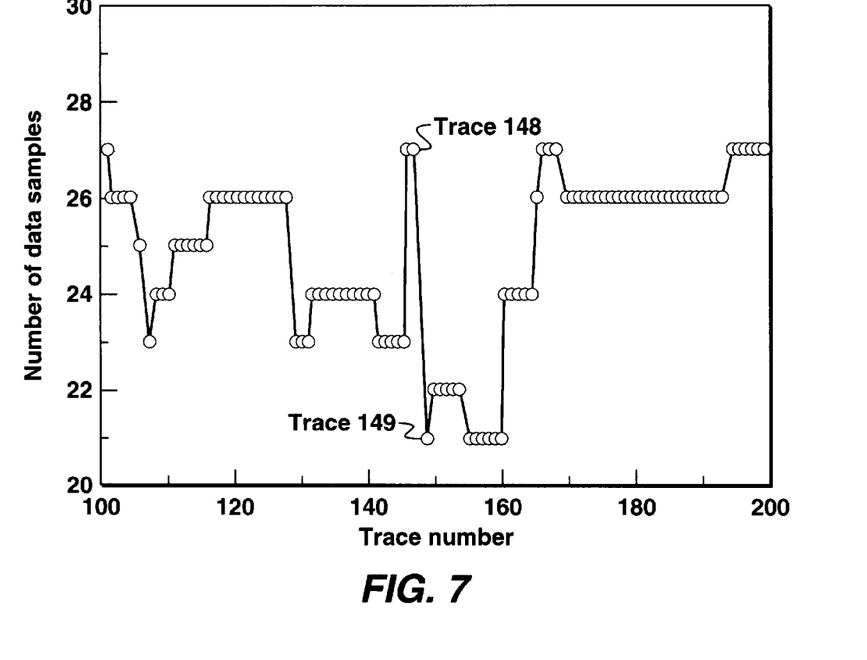
FIG. 7 is a plot of the number of data samples falling within the target formation for each of the 100 traces of FIG. 6.

FIG. 7 shows the number of data samples falling within subsurface formation 12 for each of the traces. As noted above, where the two traces being compared have different numbers of data samples within the interval of interest, a portion of the longer trace (i.e., the trace with the larger number of data samples) should be ignored. The data samples which are ignored are those which are farthest removed from the selected datum surface. For example, if trace 148 (27 data samples) is being compared to trace 149 (21 data samples), only the first 21 data samples of trace 148 beginning at the selected datum surface, upper horizon 14, should be considered in calculating the statistics.

Figure 8:
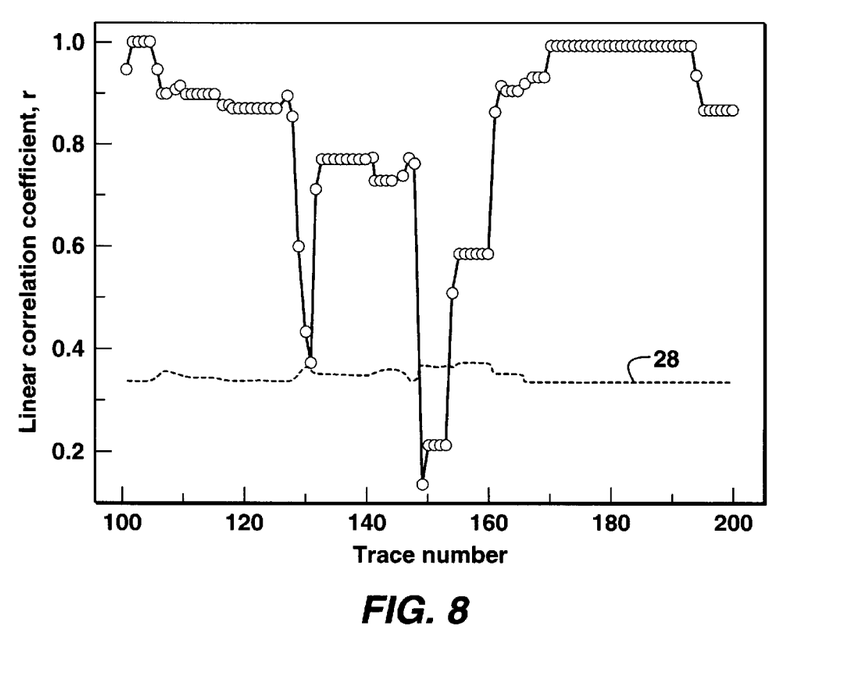
FIG. 8 is a plot of the linear correlation coefficient for the portion of each of the 100 traces falling within the target formation using trace 180 as the reference trace.

FIG. 8 shows the results of calculating the linear correlation coefficient r for each of the traces with respect to trace 180 (the reference trace). Dotted line 28 represents the minimum value of r necessary for a 95% confidence level that the selected trace and trace 180 have similar temporal behavior. It can be seen that only traces 149 through 153 do not satisfy this test. Referring back to FIG. 6, it can be seen that traces 149 through 153 are significantly different from the surrounding traces. However, it is virtually impossible to determine by visual inspection of FIG. 6 whether the temporal behavior of traces 149 through 153 is the same as or different from that of trace 180. The present invention permits this determination to be made.

Figure 9:
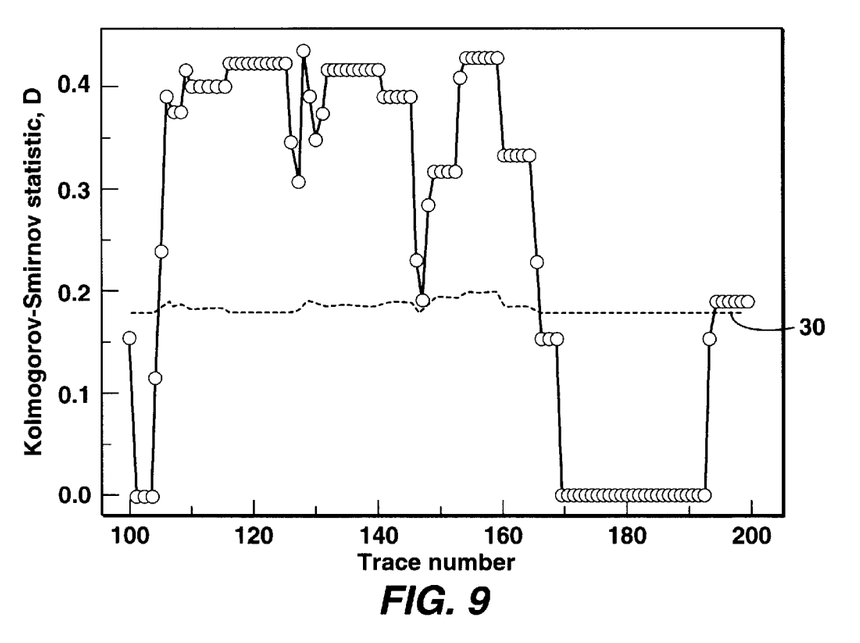
FIG. 9 is a plot of the Kolmogorov-Smirnov statistic for the portion of each of the 100 traces falling within the target formation using trace 180 as the reference trace.

FIG. 9 shows the results of calculating the Kolmogorov-Smirnov statistic D for each of the traces, with respect to trace 180. Dotted line 30 represents the maximum value of D for which it can be concluded to a confidence level of 80% that the two traces have similar atemporal behaviors. Only traces 101–105 and 167–194 passed this test.

As can be seen from FIGS. 8 and 9 and the discussion above, there is no requirement that the same confidence level be used for both similarity tests. The user can choose to be stricter on one of the tests than on the other.

Figure 10:
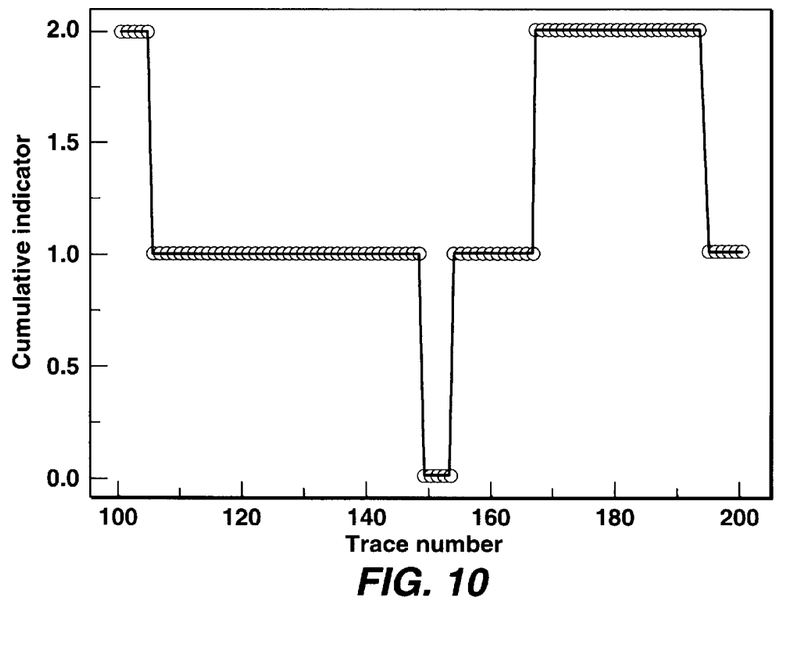
FIG. 10 illustrates the cumulative indicator method for combining and displaying the results of the linear correlation test and the Kolmogorov-Smirnov test.

FIG. 10 represents one method of combining the results of the linear correlation coefficient and the Kolmogorov-Smirnov statistic calculations. Traces which passed the linear correlation test were assigned a temporal indicator value of 1, while traces which did not pass this test were assigned a temporal indicator value of 0. Similarly, traces which passed the Kolmogorov-Smirnov test were given an atemporal indicator value of 1, while traces which did not pass this test were given an atemporal indicator value of 0. These indicator values were then summed for each trace and the results were plotted in FIG. 10. Traces which have a cumulative indicator value of 0 did not pass either test. Such traces clearly are not similar to trace 180. Traces which have a cumulative indicator value of 1 passed one of the tests, but not the other. These traces may be similar to trace 180, but need to be investigated further to determine why one of the tests was failed. Traces which have a cumulative indicator value of 2 passed both tests and, accordingly, can be considered to be similar to trace 180 within the specified confidence levels. Only traces 101–105 and 167–194 passed both tests.

FIG. 10 also illustrates the local nature of continuity. From trace 180, the seismic reflection character has continuity for a distance of 13 traces to the left (to trace 167) and for a distance of 14 traces to the right (to trace 194).

Figure 11:
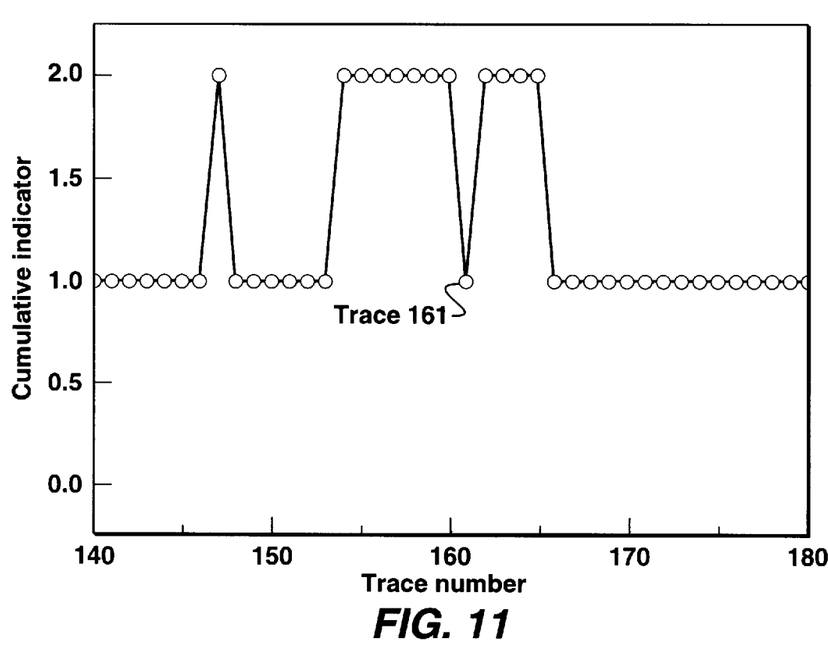
FIG. 11 illustrates the cumulative indicator for a 40 trace portion of FIG. 6 using trace 160 as the reference trace.

FIGS. 8 through 10 are valid only where trace 180 is the reference trace. If another trace is selected as the reference trace, the entire process should be repeated. For example, FIG. 11 shows the cumulative indicator for a 40 trace portion (traces 140 to 180) of FIG. 6 using trace 160 as the reference trace. It can be seen that there is essentially no similarity between FIG. 11 and the comparable portion of FIG. 10. Again, this illustrates the local nature of continuity. The reflection character of each trace must be compared to that of a reference trace, and the results are valid only with respect to that reference trace.

In FIG. 11, trace 161 has a cumulative indicator value of 1 while the traces on both sides have cumulative indicator values of 2. Refering to FIG. 6, it can be seen that the waveshape of trace 161 is different from that of the neighboring traces (the trough around t=2.130 seconds has almost disappeared). Use of the present invention has clearly identified this difference. As would be apparent to persons of ordinary skill in the art, this difference may represent a geologic feature such as a fault or, more likely, trace 161 may simply be a bad trace.

Figure 12A:
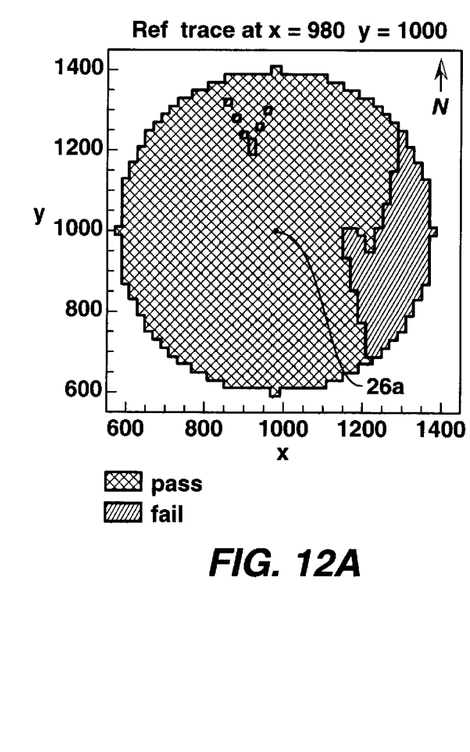
FIGS. 12A, 12B, and 12C illustrate the map view method for displaying the results of a single statistical test of similarity, the linear correlation coefficient.
Figure 12B:
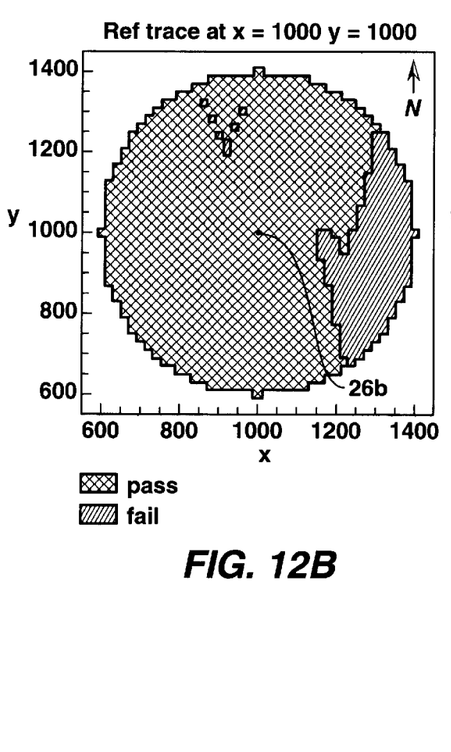
Figure 12C:
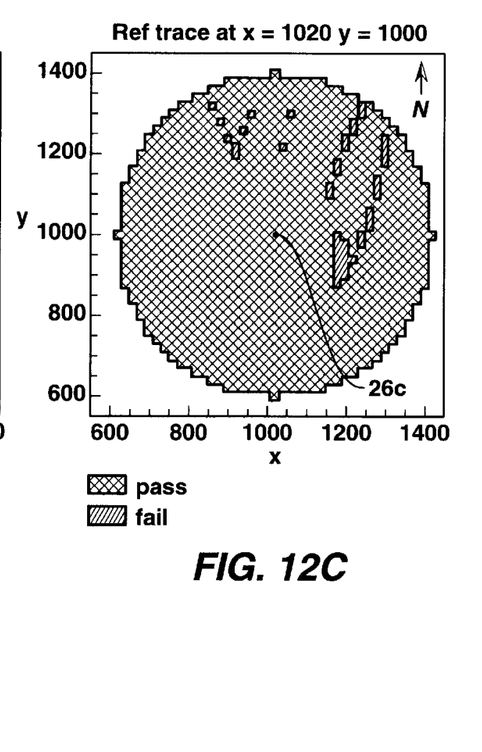

FIGS. 12A through 12C are map views which illustrate another way to display the results obtained using the present invention. Each map view shows a portion of a 3D seismic survey centered at the reference trace location. Referring first to FIG. 12B, reference trace 26*b* is located at map coordinates x=1000, y=1000. The linear correlation coefficient r between reference trace 26*b* and each other trace falling within a twenty trace radius of reference trace 26*b* has been calculated and compared to the threshold value needed for the specified confidence level. Different types of hatching have been used to distinguish traces which passed this test from traces that failed.

Turning now to FIG. 12A, reference trace 26*a* is located one trace to the west of reference trace 26*b* (i.e., at map coordinates x=980, y=1000). The linear correlation coefficient r has been calculated for all traces falling within a twenty trace radius from reference trace 26*a*. The results are very similar to those obtained for reference trace 26*b*.

In FIG. 12C, the reference trace 26*c* has been moved one trace to the east of reference trace 26*b* (i.e., to map coordinates x=1020, y=1000), and the linear correlation coefficient r has again been computed for all traces falling within a twenty trace radius from reference trace 26*c*. In this case, however, the results are somewhat different from those of FIGS. 12A and 12B, indicating that the subsurface properties at reference trace 26*c* are somewhat different from those at reference traces 26*a* and 26*b*.

Figure 13A:
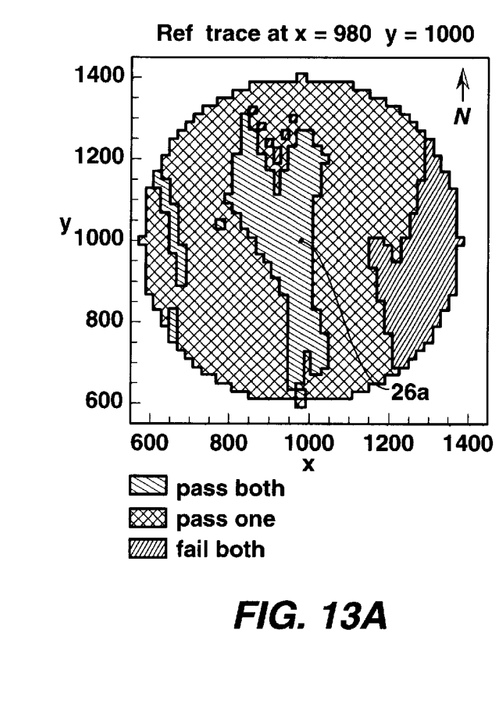
FIGS. 13A, 13B, and 13C illustrate the map view method for combining and displaying the results of two statistical tests of similarity, the linear correlation coefficient and the Kolmogorov-Smirnov statistic.
Figure 13B:
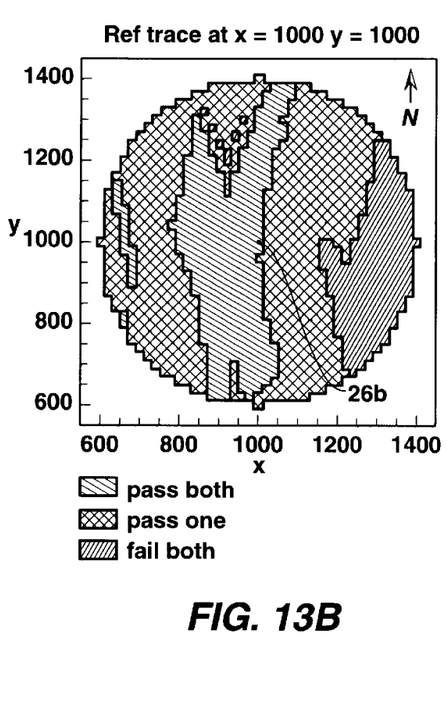
Figure 13C:
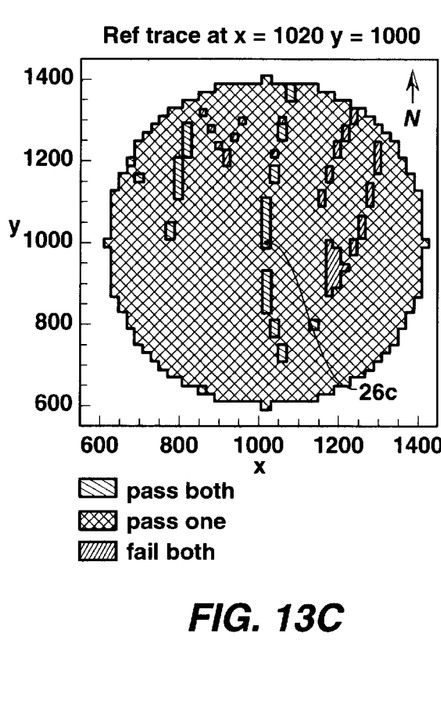

FIGS. 13A through 13C illustrate the results obtained when the Kolmogorov-Smirnov statistic D is also calculated and added to the map view displays of FIGS. 12A through 12C. It can be seen that reference traces 26*a* and 26*b* fall into relatively large areas where the traces passed both tests, but that reference trace 26*c* falls outside of this area. Thus, assuming that reference trace 26*b* represents an existing hydrocarbon producing well, a second well intended to penetrate the same formation should clearly be located to the west, and not the east, of the existing well.

Map view plots such as FIGS. 12A through 12C and 13A through 13C also illustrate the angular dependence of continuity. For example, in FIG. 13A, continuity extends for a distance of 13 traces to the north, one trace to the east, 17 traces to the south, and 5 traces to the west from reference trace 26*a*. Continuity in any direction can easily be determined in this manner.

Figure 14:
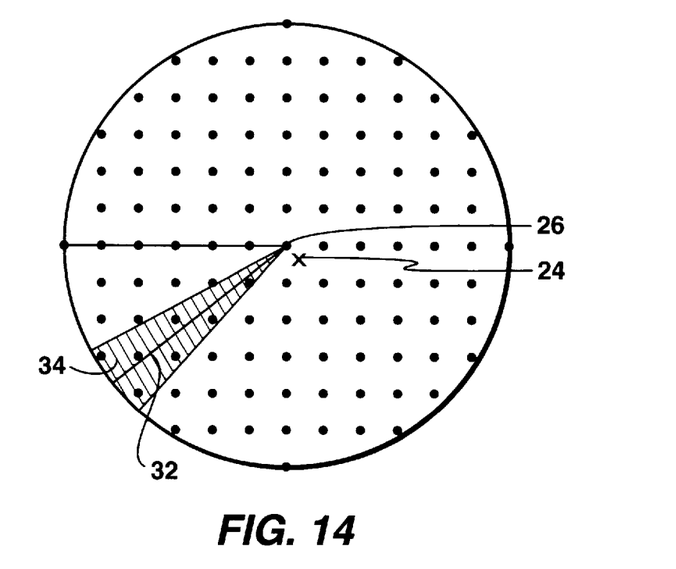
FIG. 14 is a trace map illustrating use of the invention where the desired azimuthal direction does not fall along or perpendicular to any survey line.

In some cases, it may be desired to calculate continuity in an azimuthal direction that does not fall along or perpendicular to any survey line. As illustrated in FIG. 14, this can be done by using the desired azimuthal direction (as indicated, for example, by line 32) to define a circular sector 34 extending for a specified number of degrees on either side of line 32. All traces falling within sector 34 are then projected onto line 32 and the calculations proceed as described above. In the limit, the sector could extend up to 90 degrees on either side of line 32; however, preferably the sector is limited to traces falling within about 30 degrees, and more preferably about 20 degrees, on either side of line 32.

Figure 15:
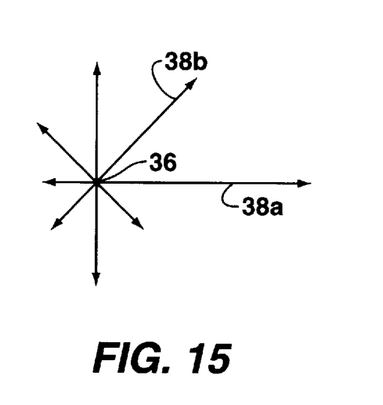
FIG. 15 is a rose diagram in which vectors are used to display the continuity in several different directions from a selected seismic data trace location.
Figure 16:
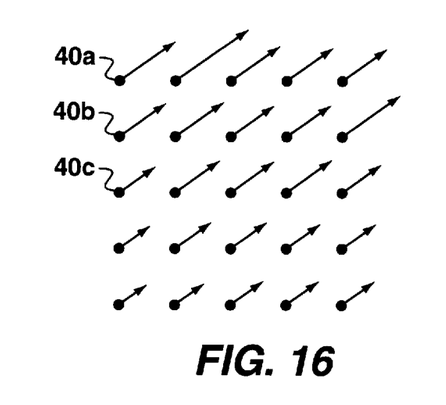
FIG. 16 is a map illustrating a method for displaying the continuity in a specified direction for a plurality of seismic data trace locations.

As noted above, the invention may also be used in a reconnaissance mode to aid in interpretation of a seismic survey. In the reconnaissance mode, the method is applied in a systematic manner to at least a portion of the individual data traces comprising the survey in order to attempt to discover spatial geometric features in the data which are suggestive of certain geologic and/or depositional environments. For example, in the reconnaissance mode the horizontal area surrounding each trace location could be divided into a number of circular sectors and a local measure of continuity can be determined for each sector. These continuity values could then be considered to be trace attributes of the specific data trace in question. All or any portion of these continuity values can then be displayed in a variety of different manners, such as by using color scales or vector representations. FIG. 15 is an example of a rose diagram of the continuity values surrounding a single trace 36 of a seismic survey. In this case, the horizontal area surrounding trace 36 has been divided into eight circular sectors, each of which extends for 22½° on either side of the continuity vectors 38*a*, 38*b*, etc. The length of each continuity vector 38*a*, 38*b*, etc. represents the lateral continuity in the indicated direction. Alternatively, the display could be limited to a subset of the continuity vectors (e.g., only the longest and the shortest vectors indicating, respectively, the direction and distance of the largest and smallest lateral continuity). FIG. 16 illustrates another type of display in which the continuity vector in only one selected direction is displayed for a plurality of traces 40*a*, 40*b*, 40*c*, etc. Another possibility would be to display only the largest continuity vector for each trace. Persons skilled in the art could easily devise additional mathematical, statistical, and display methods to summarize in map form the "continuity" of the traces in a seismic survey.

FIGS. 10, 12A–C, and 13A–C illustrate another interesting feature of the present invention, i.e., its ability to detect separate areas which may have similar lithologies to that surrounding the reference trace. In FIG. 10, traces 101–105 have cumulative indicators of 2, indicating that their reflection characters are similar to that of trace 180. However, they are separated from trace 180 by a large number of traces which passed only one of the tests and a few that did not pass either test. It is entirely possible that the subsurface formation around traces 101–105 is a continuation of the subsurface formation around trace 180 which was separated by some later-developing subsurface formation. Similarly, FIG. 13A shows a number of traces on the far west side which passed both tests. These traces could represent a continuation of the formation around reference trace 26*a*. The fact that these areas are disconnected decreases the confidence that they have the same physical properties, but the fact that they have essentially the same reflection character indicates that there is a good chance that they are from the same seismic facies unit. In this sense, the present invention can be used to identify objectively and systematically the seismic facies peculiar to an interval, even in the absence of well control (i.e., no well in the area in question).

Many other ways to display the results obtained with the present invention will be apparent to persons skilled in the art. For example, the results could be displayed in graphical or tabular format or maps could be constructed where the actual values of the statistics are plotted rather than cumulative indicator values. Each individual statistic can be displayed separately, or composite displays can be devised. All such display methods are intended to be within the scope of the invention.

As described herein, continuity must be measured with respect to a designated reference trace. If a well has been drilled in the area of interest, then the reference trace should preferably be the trace nearest to the well. If, however, no wells have been drilled in the survey area, then continuity should be considered to be a trace-specific attribute which can be calculated for all traces in a survey or for any desired subset of the traces.

If multiple wells are available, the present invention may be used to select only the most representative traces around each well. These traces can be used for calibration purposes by extracting seismic attributes from them and relating these attributes to physical properties measured at the wells for the analysis interval in question. Bad traces, i.e., traces that are significantly different from surrounding traces, can be easily identified and excluded. Their exclusion, in spite of their proximity to the well location, can significantly improve the calibration performance and ultimately increase the confidence or reliability of the predictions.

Finally, the method of the present invention could also be used with a time slice or a shift above or below an interpreted horizon rather than an interpreted interval, and used to create "continuity volumes." Such continuity volumes would be created by applying the method of the present invention to an interval, as described above, and then reapplying it to successive intervals which are shifted up or down a few samples from the initial position resulting in a series of layered continuity maps. The main advantage of this procedure is that the measure of continuity is determined from analysis of the data themselves under the constraints set forth by the confidence level thresholds, and not by any a priori estimate of such continuity. Persons skilled in the art could easily adapt the teachings set forth herein to these other types of target zones.

The method for estimating lateral continuity described herein is not to be unduly limited to the foregoing which has been set forth for illustrative purposes only. Various modifications and alternatives will be apparent to those skilled in the art without departing from the true scope of the invention as defined in the following claims.

I claim:

1. A method for measuring lateral continuity at a specified location in a subsurface target formation from a set of seismic data traces, said method comprising the steps of:
   (a) selecting the seismic data trace nearest to said specified location and designating said trace as the reference trace;
   (b) for each seismic data trace located within a specified lateral distance from said reference trace,
      (i) calculating at least one statistic that measures the similarity between the portion of said seismic data trace within said subsurface target formation and the portion of said reference trace within said subsurface target formation, each said statistic having a corresponding significance test, and
      (ii) comparing each said statistic to said corresponding significance test to determine whether said seismic data trace is the same as or different from said reference trace; and
   (c) using the results of step (b) to quantitatively measure the lateral continuity at said reference trace.

2. The method of claim 1, further comprising the step of displaying the results of step (c) in graphical, tabular, or map format.

3. The method of claim 1, wherein said at least one statistic is the linear correlation coefficient.

4. The method of claim 1, wherein said at least one statistic is the Kolmogorov-Smirnov statistic.

5. The method of claim 1, wherein said at least one statistic is the Spearman rank-order correlation coefficient.

6. The method of claim 1, wherein said at least one statistic is Kuiper's statistic.

7. The method of claim 1 wherein said at least one statistic measures the similarity of both the temporal and atemporal behaviors of said seismic data trace and said reference trace.

8. The method of claim 7, wherein the linear correlation coefficient and the Kolmogorov-Smirnov statistic are used, respectively, to measure the similarity of the temporal and atemporal behaviors of said seismic data trace and said reference trace.

9. The method of claim 7, wherein the linear correlation coefficient and Kuiper's statistic are used, respectively, to measure the similarity of the temporal and atemporal behaviors of said seismic data trace and said reference trace.

10. The method of claim 7, wherein the Spearman rank-order correlation coefficient and the Kolmogorov-Smirnov statistic are used, respectively, to measure the similarity of the temporal and atemporal behaviors of said seismic data trace and said reference trace.

11. The method of claim 7, wherein the Spearman rank-order correlation coefficient and Kuiper's statistic are used, respectively, to measure the similarity of the temporal and atemporal behaviors of said seismic data trace and said reference trace.

12. A method for measuring lateral continuity at a specified location in a subsurface target formation from a set of seismic data traces, said method comprising the steps of:
   (a) selecting the seismic data trace nearest to said specified location and designating said trace as the reference trace;
   (b) for each seismic data trace located within a specified distance from said reference trace,
      (i) calculating a first statistic that measures the similarity between the temporal behaviors of the portions of said seismic data trace and said reference trace located within said subsurface target formation, said first statistic having a corresponding first significance test,
      (ii) calculating a second statistic that measures the similarity between the atemporal behaviors of the portions of said seismic data trace and said reference trace located within said subsurface target formation, said second statistic having a corresponding second significance test, and
      (iii) comparing said first and second statistics, respectively, to said first and second significance tests to determine whether said seismic data trace is the same as or different from said reference trace; and
   (c) using the results of step (b) to quantitatively measure the lateral continuity at said reference trace.

13. The method of claim 12, further comprising the step of displaying the results of step (c) in graphical, tabular, or map format.

14. The method of claim 12, wherein a seismic data trace must satisfy both said first and second significance tests in order to be considered the same as said reference trace.

15. The method of claim 12, wherein a seismic data trace must satisfy one of said first and second significance tests in order to be considered the same as said reference trace.

16. The method of claim 12, wherein said first statistic is the linear correlation coefficient and said second statistic is the Kolmogorov-Smirnov statistic.

17. The method of claim 12, wherein said first statistic is the linear correlation coefficient and said second statistic is Kuiper's statistic.

18. The method of claim 12, wherein said first statistic is the Spearman rank-order correlation coefficient and said second statistic is the Kolmogorov-Smirnov statistic.

19. The method of claim 12, wherein said first statistic is the Spearman rank-order correlation coefficient and said second statistic is Kuiper's statistic.

20. A method for measuring the lateral continuity in a specified azimuthal direction at a specified location in a subsurface target formation from a set of seismic data traces, said method comprising the steps of:

(a) selecting the seismic data trace nearest to said specified location and designating said trace as the reference trace;

(b) selecting a plurality of seismic data traces from said set of seismic data traces, said selected traces being located within a specified lateral distance and generally in said specified azimuthal direction from said reference trace, and for each selected seismic data trace, (i) calculating at least one statistic that measures the similarity between the portion of said seismic data trace within said subsurface target formation and the portion of said reference trace within said subsurface target formation, each said statistic having a corresponding significance test, and (ii) comparing each said statistic to said corresponding significance test to determine whether said seismic data trace is the same as or different from said reference trace; and (c) using the results of step (b) to quantitatively measure the lateral continuity in said specified azimuthal direction at said reference trace.

21. The method of claim 20, wherein said selected seismic data traces fall within a circular sector extending for a specified number of degrees on either side of said specified azimuthal direction.

22. The method of claim 21, wherein said specified number of degrees is less than or equal to about 30 degrees.

23. The method of claim 20, further comprising the step of displaying the results of step (c) in graphical, tabular, or map format.

* * * * *